Figure 1:
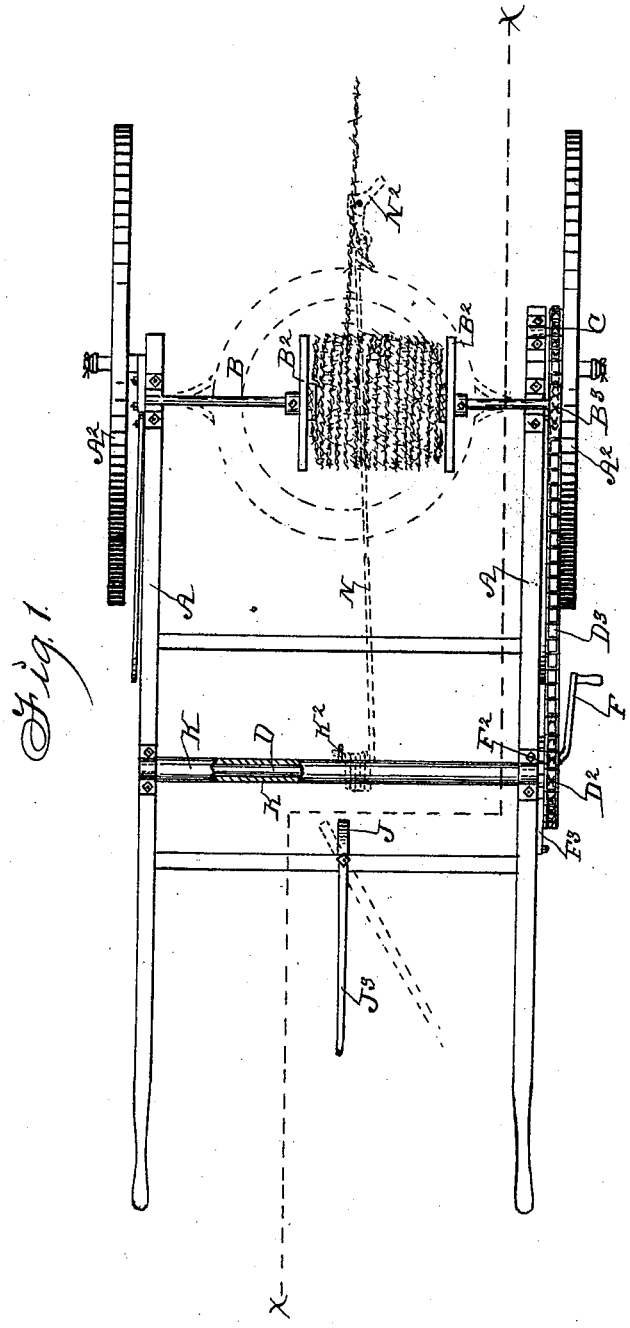

(No Model.) 2 Sheets—Sheet 1.

H. FRICK.
WIRE REEL AND STRETCHER.

No. 519,037. Patented May 1, 1894.

Witnesses:
Charles F. Wilcox.
R. H. Orwig.

Inventor: Henry Frick.
by Thomas G. Orwig and
J. Ralph Orwig Attorneys.

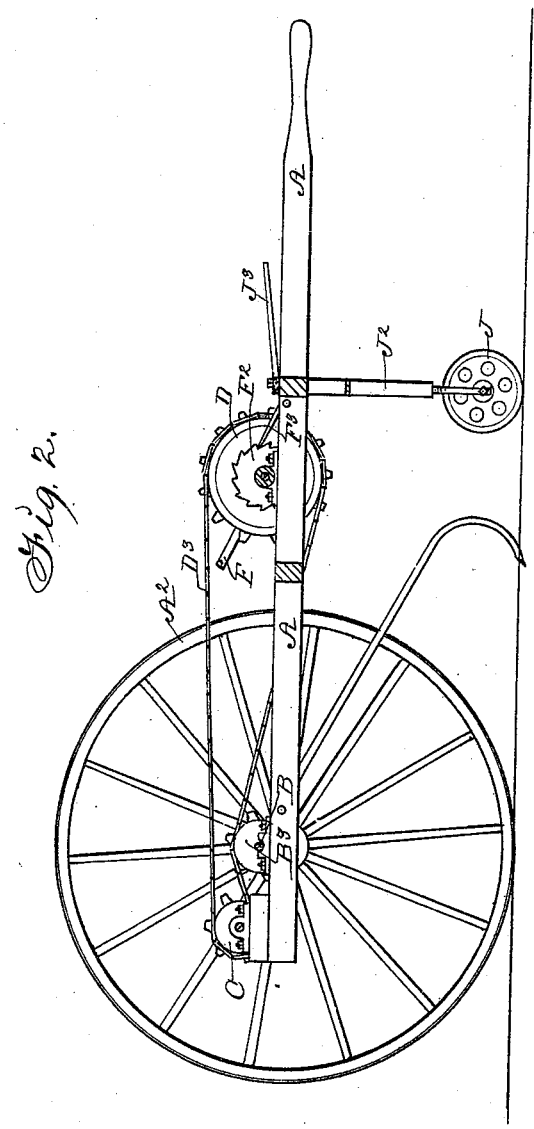

UNITED STATES PATENT OFFICE.

HENRY FRICK, OF GRANGER, IOWA.

WIRE REEL AND STRETCHER.

SPECIFICATION forming part of Letters Patent No. 519,037, dated May 1, 1894.

Application filed August 28, 1893. Serial No. 484,169. (No model.)

*To all whom it may concern:*

Be it known that I, HENRY FRICK, a citizen of the United States of America, residing at Granger, in the county of Dallas and State of Iowa, have invented an Improved Wire Reel and Stretcher, of which the following is a specification.

The object of my invention is to provide a simple, cheap and durable frame mounted on wheels and having mechanism thereon which may be manually operated to reel a spool of wire in the most advantageous position to the operator, and in which the wire may be wound upon the spool so that it may be seen as it is placed thereon and the machine conveniently guided so that the wire may be wound upon the spool in a regular and uniform manner.

To this end my invention consists in the construction of the winding mechanism and the arrangement and combination therewith of a device for steering the carriage so as to control the winding of the wire upon the spool, as hereinafter set forth, pointed out in my claims and illustrated in the accompanying drawings, in which—

Figure 1 is a top or plan view of the complete machine. Fig. 2 is a vertical, longitudinal, sectional view through the line $x$—$x$, of Fig. 1.

Referring to the accompanying drawings, the reference letter A is used to designate a suitable frame mounted on the wheels $A^2$ and having the handles $A^3$ formed at its rear end. Near its front end is detachably and rotatably mounted a rod B upon which a spool $B^2$ may be fixed.

$B^3$ is a sprocket wheel on the outer end of said rod and C is a second sprocket wheel of the same size having bearings in the machine frame, in advance of the one $B^3$.

D designates a shaft rotatably mounted on the rear of the machine frame and having a sprocket wheel $D^2$ of a diameter larger than the aforesaid ones mounted on its end.

$D^3$ is a sprocket chain passed around the wheel $D^2$ and the wheel C, and over the wheel $B^3$, to thereby impart a rotary motion to the rod B, in an opposite direction from that in which the shaft D is rotated, for purposes hereinafter explained.

F is a crank fixed to the outer end of the shaft D and $F^2$ is a ratchet wheel also fixed to said shaft and adapted to be engaged by a pawl or detent H, to prevent the unwinding of the spool. It will be obvious that the crank F being placed upon the right hand side of the shaft may be operated forwardly from a position at the upper limit of the movement, to wind the wire, this being by far the most advantageous position for a person operating the device. Furthermore, when the spool is turned in this direction the wire is placed first upon the top of the spool so as to be in plain sight of the operator in order that it may be distributed upon the spool in an even and uniform manner.

J designates a wheel fixed to the end of an upright $J^2$ that is pivotally mounted in the rear end of the frame A and $J^3$ is a lever or handle fixed to the top of said upright whereby the said wheel may be turned at any angle and the whole machine guided.

By placing the guiding wheel J and the crank F in the positions set forth, it will be seen that one man may readily operate the winding mechanism with one hand to coil the wire upon the spool and advance the device by pulling upon the said wire, and steer the device with the other hand.

K designates a cylinder fixed to the central portion of the shaft D and $K^2$ is a hook thereon. A rope or cable N is attached to the hook and has a clutch device $N^2$ on its other end adapted to grasp the wire in advance of the spool, so that when the crank F is rotated the sleeve K will also be turned, to provide means for stretching it much tighter than is possible by rotating the spool.

The dotted lines in Fig. 1 show a device adapted to be placed on the frame A in lieu of the rod B whereby the machine may be utilized for carrying barrels, &c. This feature however, forms no part of my present invention.

Having thus described the construction, arrangement, and function of each separate feature of my machine, what I claim as new therein, and desire to secure by Letters Patent of the United States therefor, is—

1. An improved wire reel and stretcher, comprising two wheels; a suitable frame mounted thereon and having handles at its rear end whereby it may be moved; a steering wheel mounted in the rear of said frame substantially as set forth; a rotatable shaf at the forward end of said frame adapted to receive a spool; a crank at the rear of the frame in position to be operated by a person holding the steering device, and means for rotating the spool by said crank substantially as and for the purposes stated.

2. An improved wire reel and stretcher, comprising two wheels; a suitable frame mounted thereon and having handles at its rear end whereby it may be moved; a steering wheel mounted in the rear of said frame, substantially as set forth; a rotatable shaft at the forward end of the frame adapted to receive a sprocket wheel fixed to said shaft; a sprocket wheel mounted in bearings in advance of the aforesaid sprocket; a shaft rotatably mounted in the rear portion of the frame; a crank fixed to said shaft in position to be operated by a person operating the said steering device; a sprocket wheel on said shaft, and a chain arranged upon the aforesaid sprocket wheels in the manner stated, to rotate the spool in an opposite direction from the crank, for the purposes stated.

3. An improved wire reel and stretcher comprising two wheels; a suitable frame mounted thereon and having handles at the rear end whereby it may be moved; a steering wheel mounted in the rear of said frame, substantially as set forth; a rotatable shaft at the forward end of the frame adapted to receive a spool; a sprocket wheel fixed to said shaft; a sprocket wheel mounted in bearings in advance of the aforesaid sprocket; a shaft rotatably mounted in the rear portion of the frame; a crank fixed to said shaft in position to be operated by a person operating the said steering device; a sprocket wheel on said shaft, and a chain arranged upon the aforesaid sprocket wheels in the manner stated, to rotate the spool in an opposite direction from the crank; a hook fixed to the central portion of the aforesaid shaft; a rope or the like connected with said hook, and means for detachably connecting the said rope with the wire leading to the spool; all arranged and combined substantially as, and for the purposes, stated.

HENRY FRICK.

Witnesses:
S. O. CONGER,
SUSIE CONGER.